Patented Aug. 30, 1938

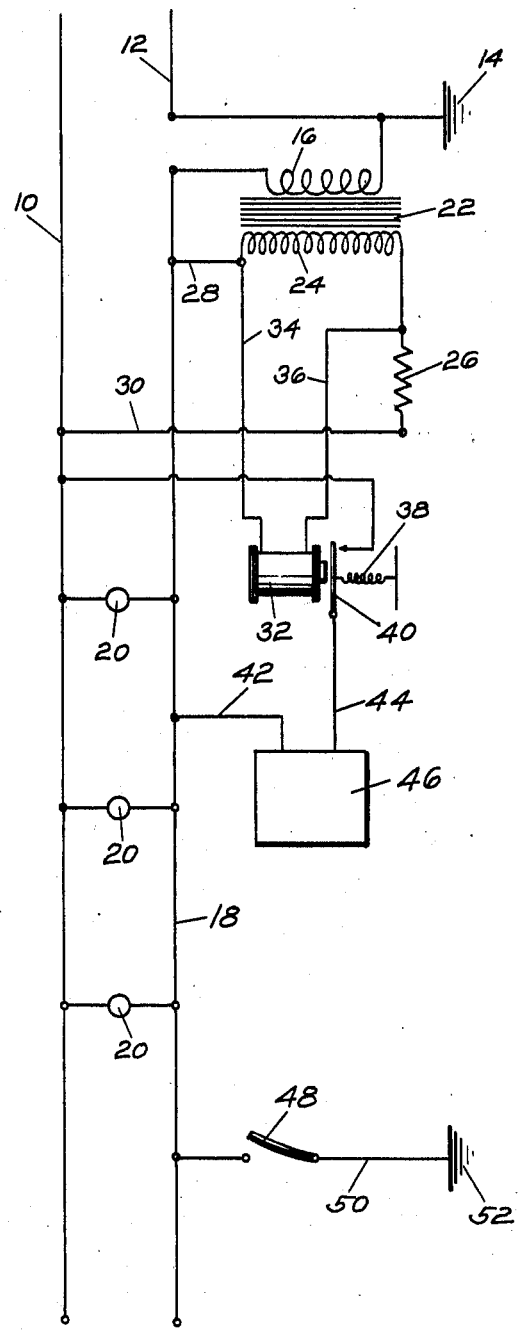

2,128,324

UNITED STATES PATENT OFFICE 2,128,324

CONTROL CIRCUIT

John J. Root, South Bend, Ind., assignor to International Engineering Corporation, Chicago, Ill., a corporation of Illinois Application November 7, 1936, Serial No. 109,738

7 Claims. (Cl. 175—320)

This invention relates to control circuits, especially of the type adapted to be connected into and operated by the usual lighting or power system, and is illustrated as embodied in a control circuit for a domestic oil burner.

An object of the invention is to utilize the regular wiring system, without interfering with its ordinary use, for connecting up two parts of the control circuit, the return circuit being through the ground. This has the additional advantage, for controls for oil burners and the like, of doing away with the low voltage lines necessary in many of the present control circuits, the usual lighting system wires taking their places.

My novel control circuit includes means for grounding the usual wiring system, under the control of a switch which in the case of an oil burner control would be a thermostatically controlled switch, to cause the ground connection between the two grounded parts of the line to become in effect a short circuit across one winding of a transformer having its other winding connected into the regular wiring system, thereby causing a change in the current flow as described below.

This change is utilized, for example by a relay, to open and close the main circuit of the oil burner or other mechanism, or otherwise to perform a control function.

The arrangement and operation of the circuit will be apparent from the following description of the wiring diagram shown in the accompanying drawing, in which:

The figure is a wiring diagram of a house lighting system having an oil burner control circuit interconnected therewith.

In this diagram, 10 and 12 indicate the usual power lines or wires of a 110 volt lighting system, the line 10 being ungrounded and the line 12 being grounded at 14. The line 12, instead of being carried unbroken past the ground 14 in the usual manner, has connected thereto adjacent the ground 14, through a secondary transformer winding 16, a wire 18 between which and the wire 10 lights 20 and other electrical equipment may be connected in parallel in the usual manner.

The winding 16, of a transformer 22 whose function is described below, is a low-resistance low-impedance secondary winding which normally has no substantial effect upon the flow of current through the wiring system. The transformer 22 has a high reactance primary winding 24 connected, in series with a resistance 26, by leads 28 and 30, across between the power lines 18 and 10.

A relay 32, of any desired type, is connected by leads 34 and 36 across the primary winding 24, the relay illustrated being an electromagnet normally holding open (against the resistance of means such as a spring 38) a switch 40 in one of the leads 42 and 44 connecting an oil burner or other electrically controlled device 46 across between the power lines 18 and 10.

The above described apparatus is intended to be controlled by a thermostatically-operated switch, or other desired type of switch 48 connected to the line 18 beyond the winding 16 (e. g., in any room whose temperature it is desired should control the oil burner). The switch 48 is connected by a lead 50 to a ground 52.

In operation, with the switch at 48 closed, there is in effect a short circuit connection from 12 through grounds 14 and 52 to line 18, which short circuits the secondary winding 16. With the drop of current in secondary 16, the primary winding 24 draws current between lines 10 and 18 because of the decrease in its reactance, all of this current also passing through the resistance 26. All the voltage which (with switch 48 open) is normally across the winding 24, and which normally holds the switch 40 open, is now across the resistance 26, and the switch 40 is closed by its spring 38.

When the switch 48 opens, the main current again all follows the path 10—20—18—16—12. This energizes the relay 32 to open the switch 40.

It will be noted that the current flow also changes in resistance 26 and in the secondary winding 16, as switch 48 opens and closes, so that if desired relays can be connected across one or both of these parts of the system, to actuate other control devices.

The windings 16 and 24 and the resistance 26 are so selected and adjusted that, with switch 48 open, the current flow in the winding 16 reacts on the winding 24 to such an extent that no current flows therein, while sufficient current flows through 30—26—32—28 to energize the relay 32 to open the switch 40. Therefore, as previously explained, when the winding 16 is short circuited by closing switch 48 and current consequently flows in winding 24, the current through the relay 32 drops and the switch 40 closes.

While one particular system has been described in detail, it is not my intention to limit the scope of the invention by that description, or otherwise than by the terms of the appended claims.

I claim:

1. A control circuit, for an oil burner or the like and in combination with a two-wire lighting or power system having one wire grounded and the other wire ungrounded, a grounded line including a thermostatically-controlled switch and which line is connected to said grounded wire, a transformer having a low-resistance low-impedance winding connected into said grounded wire in series therewith between the ground of said wire and the said grounded line and having a high-reactance winding connected between said grounded and ungrounded wires in series with a resistance, said windings being so selected as to prevent the flow of substantial current through said high-reactance winding when said switch is open, and control means having a relay connected across said high reactance winding and in parallel therewith.

2. A control circuit, for an oil burner or the like and in combination with a two-wire lighting or power system having one wire grounded and the other wire ungrounded, a grounded line including a control switch and which line is connected to said grounded wire, a transformer having a low-resistance low-impedance winding connected into said grounded wire in series therewith between the ground of said wire and the said grounded line and having a high-reactance winding connected between said grounded and ungrounded wires in series with a resistance, said windings being so selected as to prevent the flow of substantial current through said high-reactance winding when said switch is open, and control means having a relay connected across said high reactance winding and in parallel therewith.

3. A control circuit, for an oil burner or the like and in combination with a two-wire lighting or power system having one wire grounded and the other wire ungrounded, a grounded line including a control switch and which line is connected to said grounded wire, a transformer having a low-resistance low-impedance winding element connected into said grounded wire in series therewith between the ground of said wire and the said grounded line and having a high-reactance winding element connected between said grounded and ungrounded wires in series with a resistance element, said winding elements being so selected as to prevent the flow of substantial current through said high-reactance winding element when said switch is open, and control means having a relay connected across one of said elements and actuated by the change in flow of current therein caused by opening and closing said switch.

4. A control circuit comprising, in combination with a two-wire system having one grounded wire and one ungrounded wire, a grounded line including a control switch and which line is connected to said grounded wire, a transformer having one winding element connected in series in said grounded wire between its ground and said grounded line and having another winding element connected in series with a resistance element across between said grounded and ungrounded wires, control means having lead wires provided with a switch and connected between said grounded and ungrounded wires, and a relay for operating said last-named switch and which is connected across one of said elements to be actuated by the change of flow of current in said transformer when the first switch is opened and closed.

5. A control circuit comprising, in combination with a two-wire system having one grounded wire and one ungrounded wire, a grounded line including a control switch and which line is connected to said grounded wire, a transformer having one winding element connected in series in said grounded wire between its ground and said grounded line and having another winding element connected across between said grounded and ungrounded wires in series with an impedance element, control means having lead wires provided with a switch and connected between said grounded and ungrounded wires, and a relay for operating said last-named switch and which is connected across one of said elements to be actuated by the change of flow of current in said transformer when the first switch is opened and closed.

6. A control system comprising, in combination with the grounded and ungrounded wires of a two-wire power circuit, a transformer having one winding element connected in series in said grounded with and having its other winding element connected between said grounded and ungrounded wires in series with an impedance element and arranged so that the current flowing through said other winding element between said wires reacts against the current induced by the current flow in said one winding element, control means for short-circuiting said one winding element and thereby changing the induced current in said other winding element, and controlled means connected across one of said elements and actuated by the change in current flow caused by said change in induced current.

7. A control system comprising, in combination with the grounded and ungrounded wires of a two-wire power circuit, a transformer having one winding element connected in series in said grounded wire and having its other winding element connected between said grounded and ungrounded wires in series with an impedance element, control means for short-circuiting said one winding element and thereby changing the induced current in said other winding element, and controlled means connected across one of said elements and actuated by the change in current flow caused by said change in induced current.

JOHN J. ROOT.